UNITED STATES PATENT OFFICE.

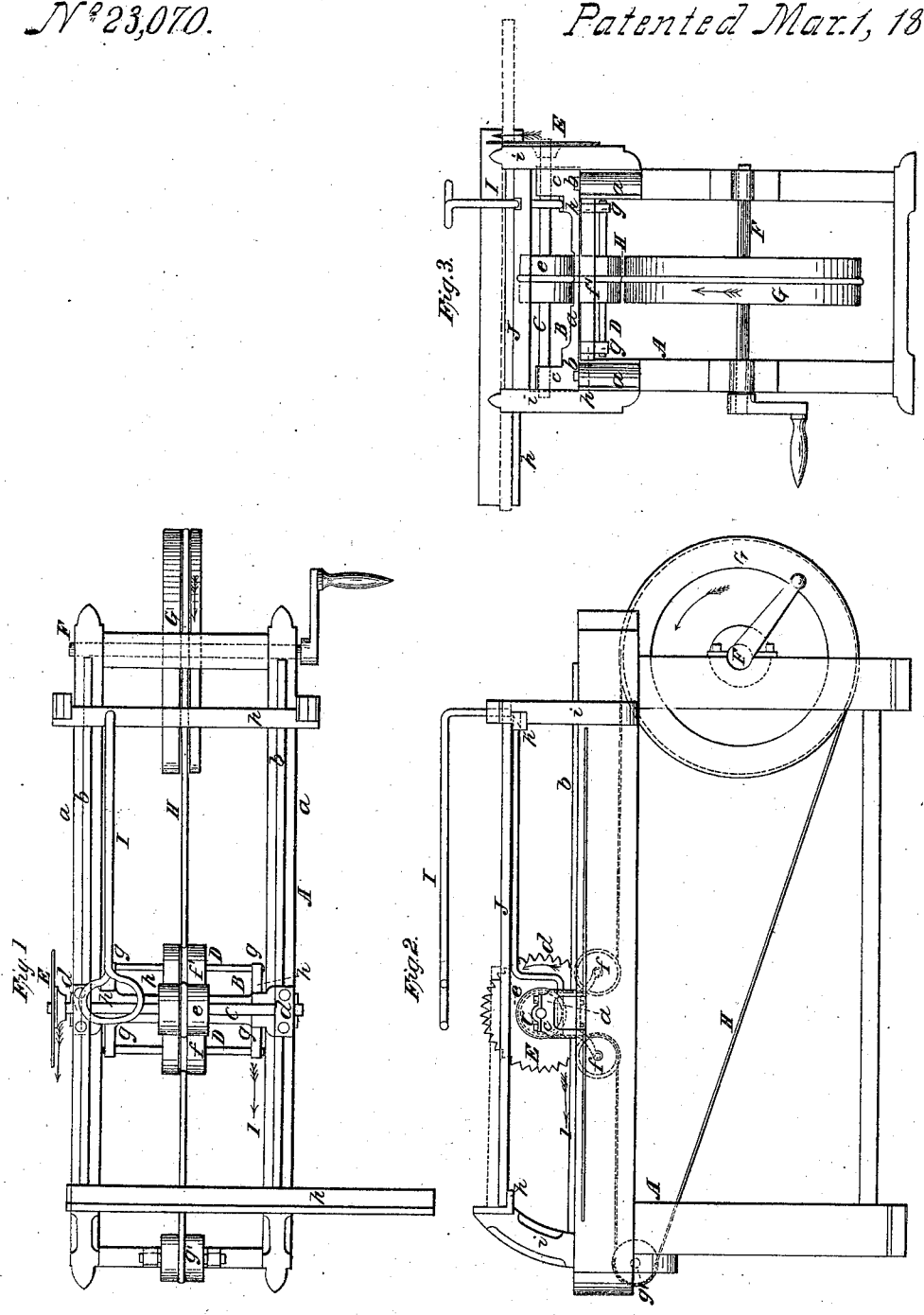

JOSEPH BATTIN, OF NEWARK, NEW JERSEY.

MACHINE FOR CROSSCUT SAWING.

Specification of Letters Patent No. 23,070, dated March 1, 1859.

*To all whom it may concern:*

Be it known that I, JOSEPH BATTIN, of Newark, in the county of Essex and State of New Jersey, have invented a new and Improved Sawing-Machine; and I do hereby declare that the following is a full, clear, and exact description of the same, reference being had to the annexed drawings, making a part of this specification, in which—

Figure 1, is a plan or top view of my invention. Fig. 2, is a side view of do. Fig. 3, is an end view of do.

Similar letters of reference indicate corresponding parts in the several figures.

This invention relates to an improvement in that class of sawing machines which are designed for cross-cut sawing, sawing planks or boards for instance into suitable or desired lengths for joiners work, the making of packing boxes, and like purposes.

The invention consists in a novel way of applying a driving belt to the saw mandrel as hereinafter fully shown and described, whereby the saw as it is rotated may be fed to its work and also moved or gigged back, the saw mandrel being under an equal tension of the belt at all points of the movement of the saw carriage.

To enable those skilled in the art to fully understand and construct my invention I will proceed to describe it.

A, represents a rectangular frame the two upper and parallel beams $a$, $a$, of which have ways $b$, $b$, for a saw carriage B, which is simply a traverse bar $a'$, fitted on the ways $b$, $b$, and provided at each end with a head $c$, to which the bearings $d$, of the saw mandrel C, is attached. On the saw mandrel C, a pulley $e$, is placed and two similar pulleys $f$, $f'$, are placed on shafts D, D, which are fitted in bearings $g$, formed on the ends of bars $h$, attached to the under side of the carriage B.

The three pulleys $e$, $f$, $f'$, are in line with each other, the two shafts D, D, being below the mandrel C, and a shaft D, at each side of it. To one end of the mandrel C, a circular saw E, is attached, said saw projecting over or beyond the frame at one side.

F, is a driving shaft which is placed in the frame A, at one end and has a pulley G, placed on it, and H, is a belt which passes around said pulley and also around the pulleys $e$, $f$, $f'$, on the carriage B, the belt passing underneath the pulley $f'$, over the pulley $e$, on the saw mandrel and down underneath the pulley $f$, and over a pulley $g'$, in the frame A. The upper part of the belt H, is horizontal or parallel with the ways $b$, $b$, and the plane of the movement of carriage B.

To the carriage B, a bent rod I, is attached, and a platform J, is placed on horizontal cleats $h$, $h$, secured to supports $i$. This platform may extend the whole width of the frame, one edge extending nearly to the saw.

The operation is as follows:—The stuff to be sawed, shown in red and designated by K, is placed on the platform J, so that the grain of the stuff will be transverse with the plane of rotation of the saw. Motion is given the shaft F, by any proper means, the pulley G rotating in the direction indicated by the arrow upon it and the belt H, rotating the saw E, in the direction indicated by the arrow adjoining it. The pulleys $f$, $f'$, in the carriage B, cause the belt H, to have a sufficient bearing around the pulley $e$, of the saw mandrel C, and the carriage B may be drawn back and forth on the ways $b$, $b$, without at all affecting the operation of the saw or the belt H, which drives it. The saw is fed to its work when the carriage is moving in the direction indicated by arrow 1, and the belt H, by rotating the saw E, has a tendency to thus move the carriage. In sawing light or moderately thin stuff the saw will be fed to its work without any extraneous power, but in sawing thick stuff the operator shoves the carriage along by means of the rod I, which serves as a handle. The carriage B, is gigged or drawn back by this means.

By this invention the tension of the belt will always remain the same, that is to say, it will not in any degree be affected by the movement of the carriage B, and the saw E, therefore will, under a uniform driving power and equal work, be rotated with a constant speed.

I am aware that circular saws have been attached to traveling carriages so that the saws may be fed bodily to their work, the stuff to be sawed remaining stationary, but so far as I am aware the driving belts of such machines have been provided with idle or friction pulleys placed in swinging or sliding frames. These pulleys cause the tension of the belt to vary considerably as they have not a fixed position relatively with the belt and are affected to a considerable extent by the movement of the saw carriage. In my improvement the pulleys are all on fixed axis, that is to say, they always have the same position relatively with the belt, and consequently the belt will have an equal tension or will not be affected by the movement of the carriage B. The saw therefore will not be checked in speed a contingency due to the loosening of the belt, nor can the saw mandrel be made to run with increased friction on account of an undue pressure of the belt on the mandrel, both these difficulties occurring in the ordinary machines.

I would remark that I prefer to have two pulleys $f\ f'$ in the carriage B, although one may be dispensed with.

Having thus described my invention what I claim as new and desire to secure by Letters Patent, is,

The driving pulley $e$, of the saw mandrel in connection with the pulleys $f,\ f'$, one or both, placed in the carriage B, and the driving belt H, the parts being combined and arranged to operate substantially as and for the purpose set forth.

JOSEPH BATTIN.

Witnesses:
STEPHEN R. HAINES,
JAS. G. BARNET.